United States Patent Office 3,686,072
Patented Aug. 22, 1972

3,686,072
L-ASPARAGINASE FROM ERWINIA
Denis Herbert, Flat 5, Abbey Amesbury, Amesbury, England, and Henry E. Wade, Kings Bridge Mead, Stratford-Sub-Castle, Salisbury, England
No Drawing. Filed Aug. 21, 1969, Ser. No. 856,521
Claims priority, application Great Britain, Aug. 23, 1968, 40,343/68
Int. Cl. A61k 19/00; C12d 13/10
U.S. Cl. 195—62                                    16 Claims

ABSTRACT OF THE DISCLOSURE

The enzyme L-asparaginase, used for leukemia therapy, may be produced in high yield and with high activity from cultures of the bacterial genus Erwinia, particularly the species *Erwinia carotovora*.

---

This invention relates to improvements in the production of the enzyme L-asparaginase.

The enzyme L-asparaginase (3.5.1.1. L-asparagine amido hydrolase in the nomenclature of the International Enzyme Commission 1961) when separated from certain sources has been found to exhibit anti-tumour activity and to offer a new and promising therapy for some forms of leukemia and disseminated cancer (see for example the paper by Hill et al. J.A.M.A., 1967, 202, No. 9, p. 116). The anti-tumour activity was first detected in guinea pig serum, but was later also shown to be present in cultures of the bacteria *Escherichia coli* and *Serratia marcescens*.

L-Asparaginase is normally obtained commercially by extraction from *Escherichia coli* cultures. However, commercial production has been hampered by the relatively low activity level of L-asparaginase in these cultures and consequently L-asparaginase is in rather short supply and therapeutic use of the enzyme has been severely handicapped.

We have discovered a further genus of bacteria which contain a medically useful L-asparaginase normally in considerably larger quantities than either *Escherichia coli* or *Serratia marcescens*.

According to the invention, therapeutically active L-asparaginase is isolated from bacteria of the genus Erwinia, a known genus pathogenic towards plants. L-asparaginase is conveniently isolated from this genus by growing the bacteria upon a suitable nutrient medium until a desired quantity is obtained and then extracting the L-asparaginase either by conventional cell disruption methods, or preferably, by processes more fully described in our U.S. patent application Ser. No. 852,082 filed Aug. 21, 1969.

The enzyme activities of the Erwinia species and particularly of strains of the species *Erwinia carotovora* are often high and may be much higher than have been obtained from sources used hitherto for supplying the enzyme L-asparaginase.

In processes in accordance with the present invention, L-asparaginase may be obtained from bacteria of the genus Erwinia grown under any of the conditions under which growth of this type or organism will normally take place. Bergey has discussed the growth criteria of Erwinia on page 355 of this Manual of Determinative Bacteriology 7th Ed., 1957. The bacteria may be grown in a variety of solid or liquid culture media, the latter being preferred for large scale production. Simple chemically defined media, containing nitrogen in inorganic form, and carbon sources such as glucose, glycerol or the like, may be used. Alternatively, the bacteria may be grown in complex media containing peptones, protein hydrolysates, yeast autolysates, or the like. Alternative or additional nitrogen or carbon sources may of course be employed. When the bacteria are grown in liquid media, either the batch or continuous methods of cultivation may be used. Cultures are maintained at between 10 and 40° C., preferably 25 to 35° C., and at a pH of between about 6 and 8. The bacteria are normally grown under aerobic conditions but may be produced under anaerobic conditions in suitable circumstances.

In the following example, species of *Escherichia coli*, *Serratia marcenscens* and Erwinia are grown under identical conditions and the specific activity of L-asparaginase produced is compared in Table 1.

EXAMPLE 1

Each of the bacteria listed in the table was grown on a nutrient agar (Plate Count Agar, Oxoid Ltd.) at 30° C. for 48 hours. Portions of bacteria were transferred with a platinum loop to 0.05 M-borate buffer (0.05 M with respect to $Na^+$) at pH 8.5 to a concentration of 0.5 to 2 mg./ml. protein (as determined by the Lowry method). A portion of this was further diluted to about 10–50 μg. protein/ml. in 0.05 M-borate buffer, and the protein determined. A second portion was diluted to 10–50 μg. protein/ml. with 0.05 M-borate buffer containing 50 μg./ml. of Bovine Serum Albumin Fraction V (Armour Chemical Co.) for L-asparaginase determination. This assay was carried out by incubating a suspension of the diluted buffered bacterial culture with 10 mM. L-asparagine for 20 minutes at 37° C. The ammonia produced was determined by the Nessler method. The specific activity of the culture was then expressed as the ratio of the enzyme activity (μmole of ammonia produced/min.) to mg. of protein.

TABLE 1

| Bacterium | Collection No. | Specific activity |
|---|---|---|
| *Escherichia coli* | A.T.C.C. 11303 | 0.48 |
|  | M.R.E. 163 | 0.27 |
|  | M.R.E. 164 | 0.65 |
|  | N.C.T.C. 8164 | 0.46 |
|  | N.C.T.C. 8196 | 0.36 |
|  | N.C.T.C. 9001 | 0.47 |
| *Serratia marcescens* | N.C.I.B. 1377 | <0.05 |
|  | N.C.I.B. 4612 | <0.05 |
|  | N.C.I.B. 8266 | 0.2 |
|  | N.C.I.B. 8889 | 0.15 |
|  | N.C.I.B. 9155 | 0.15 |
|  | M.R.E. UK/8 | 0.26 |
| *Erwinia aroideae* | N.C.P.P.B. 1274 | 0.54 |
|  | N.C.P.P.B. 1380 | 1.15 |
| *Erwinia atroseptica* | N.C.P.P.B. 549 | 0.54 |
| *Erwinia carotovora* | N.C.P.P.B. 31 | 0.53 |
|  | N.C.P.P.B. 312 | 1.5 |
|  | N.C.P.P.B. 392 | 0.6 |
|  | N.C.P.P.B. 438 | 1.0 |
|  | N.C.P.P.B. 468 | 0.51 |
|  | N.C.P.P.B. 491 | 0.95 |
|  | N.C.P.P.B. 569 | 0.79 |
|  | N.C.P.P.B. 708 | 4.9 |
|  | N.C.P.P.B. 898 | 1.2 |
|  | N.C.P.P.B. 1065 | 4.1 |
|  | N.C.P.P.B. 1066 | 6.3 |
|  | N.C.P.P.B. 1120 | 3.0 |
|  | N.C.P.P.B. 1280 | 1.5 |
| *Erwinia carotovora* | N.C.P.P.B. 1281 | 1.0 |
| *Erwinia chrysanthemi* | N.C.P.P.B. 516 | 0.68 |

A.T.C.C.—American Type Culture Collection, U.S.A.
M.R.E.—Microbiological Research Establishment, Salisbury, England.
N.C.I.B.—National Collection of Industrial Bacteria, Aberdeen, Scotland.
N.C.P.P.B.—National Collection of Plant Pathogenic Bacteria, England.
N.C.T.C.—National Collection of Type Cultures, U.S.A.

Examples of the production of L-asparaginase in deep culture in batch-wise and continuous culture will now be described.

EXAMPLE 2

150 ml. of Robertson's cooked meat broth was inoculated with a freeze-dried culture of *Erwinia carotovova* (N.C.P.P.B. 1066) and incubated overnight (17 hrs.) at 37° C. and stored at 4° C. Roux bottle agar flats (culture surface 10 cm. x 20 cm. containing a broth of 3% Oxoid CM 129 granules solidified with 2.4% of Oxoid agar No. 3) were inoculated with 5 ml. of broth culture and incubated at 37° C. for 12 hrs., and again stored at 4° C. for up to 4 weeks. Immediately prior to use, four Roux bottles were washed off with 50 ml. of distilled water into a seed bottle and made up to 550 ml. with distilled water. The contents of the seed bottle were used to inoculate 15 litres of sterile medium (525 g. of light grade Yeatex, 3.5%) adjusted to 6.8–7.0 before sterilization and preheated to 37° C. before use. Incubation for 12 hrs. at 37° C. in a water bath with an aeration rate of 12 litres/min. through a ¼ in. bore pipe yielded the seed in a form suitable for the process.

Culture was carried out in a stainless steel sterilized culture vessel provided with a heating jacket and means for controlling the temperature of the contents.

A suitable culture vessel has sterile air inlet ports provided at its top and bottom. The lid, which enables the vessel to be hermetically sealed, has entry ports through which antifoam agent, buffer, seed and supplement may be admitted. A stainless steel stirrer is provided for agitation of the contents of the vessel and a pH control device is included. The pH controller may be set to the required pH value and as pH rises during cultivation a peristaltic pump delivers on demand autoclaved 3.2 M phosphoric acid buffer.

The culture medium was prepared by the following process: 36 lbs. of Yeatex (English Grains Co. Ltd.) was dissolved in 50 litres of hot tap water, stirred and transferred to tap water contained in a sterile culture vessel to make the volume up to 369 litres. Caustic soda (0.5 litre of 10 N) was added to adjust the pH to 6.8–7. The medium was immediately sterilised by stirring for 30 min. at 121° C., temperature being controlled by a steam jacket, steam injection or purging. The medium was then cooled, the vessel pressure being maintained above atmospheric by admitting sterile air. Temperature and pH were adjusted to 37° C. and pH 6.8–7.0 respectively and an antifoam supply connected. The antifoam was 25 vol. percent aqueous silicone MS emulsion RD (trademark of Hopkin and Williams Ltd.), autoclaved and supplied aseptically to the cuture vessel lid. The pressure in the culture vessel was released and 10 litres/min. of sterile air supplied to the medium through the entry tube at the bottom of the culture vessel. The medium was circulated by the impeller at the rate of 385 rev./min.

Fifteen litres of seed was then transferred to the culture vessel through a port in the lid. The pH controller was set to give a pH value of 6.8 to 7 and the temperature controller set to 37° C. The course of the process was followed by measuring rate of carbon dioxide evolution and by making enzyme assays.

These assays showed that enzyme yield, measured as International Units (I.U.) per ml. of culture, remained stationary after about 8 hrs. in this unsupplemented media, and when this stationary stage was reached the pH and temperature controls were switched off and the air supply changed to the top of the culture vessel to provide a sterile seal. Stirring was continued and the culture cooled to 20° C. in about 1 hr. by circulating chilled water through the jacket. The culture was then centrifuged and the cell sludge transfered to a mixer. A buffer, comprising 10 mM. Tris HCl; 30 mM. sodium chloride and 1 mM. ethylenediamine tetra-acetic acid, at pH 7.0 and 20° C. was creamed with the cell sludge in a proportion of one litre buffer for each 1 kg. of sludge. L-asparaginase was then extracted from the resulting buffered mixture by the process more fully described in U.S. patent application Ser. No. 852,082 filed Aug. 21, 1969. This broadly comprises lysing the cells with strong alkali, centrifuging and salt precipitation of the supernatant to isolate the enzyme. The results for 7 cultures are shown in Table 2.

TABLE 2

| Harvest, litres | Cell sludge, kg. | Cell cream, litres | L-asparaginase activity, mega units | | Dry wt. g./l. | Total D.W. kg. | $H_3PO_4$, litres | Antifoam, litres | $CO_2$* max., percent | G./l. N in— | |
|---|---|---|---|---|---|---|---|---|---|---|---|
| | | | Culture | Cream | | | | | | Medium | Supernatant |
| 375 | 3.91 | 6.81 | 3.42 | 3.50 | 2.80 | 1.05 | 2.4 | 0.2 | 1.6 | 2.30 | 1.90 |
| 355 | 3.52 | 6.18 | 2.80 | 3.05 | 2.72 | 0.97 | 1.65 | 0.93 | 1.5 | 3.01 | 1.74 |
| 375 | 4.45 | 7.76 | 4.08 | 3.92 | 2.90 | 1.09 | 2.4 | 0.50 | 1.6 | 2.21 | 1.96 |
| 390 | 4.34 | 7.56 | 2.70 | 3.46 | 2.95 | 1.15 | 2.4 | 0.55 | 1.6 | 2.09 | 1.89 |
| 380 | 3.09 | 5.55 | 1.54 | 1.79 | 2.10 | 0.80 | 1.08 | 1.25 | 1.5 | 2.21 | 1.93 |
| 390 | 4.14 | 7.21 | 3.10 | 3.32 | 3.0 | 1.17 | 2.34 | 0.15 | 2.0 | 2.13 | 1.85 |
| 380 | 4.08 | 7.21 | 3.05 | 3.85 | 2.9 | 1.10 | 2.50 | 0.15 | 2.25 | 2.21 | 1.93 |
| 355 | 4.22 | 7.43 | 3.00 | 3.98 | 3.14 | 1.14 | 2.40 | 0.36 | 2.3 | 2.55 | 2.04 |
| 360 | 4.11 | 7.13 | 3.19 | 3.52 | 2.96 | 1.07 | 2.40 | 0.80 | 1.7 | 2.46 | 2.02 |
| 3.75 | 4.20 | 7.40 | 3.75 | 4.29 | 2.37 | 0.89 | 2.45 | 0.20 | 2.3 | 2.42 | 2.07 |
| 3,735 | 40.06 | 70.24 | 30.63 | 34.68 | | 10.43 | | | | | |

*This is the peak reading of the $CO_2$ analyser on effluent air stream.

NOTE.—Average enzyme activities: In culture—8.2 I.U./ml.; based on dry weight—2.9 I.U./mg. dry cells; based on protein, assuming that protein is 70% of dry weight—4.1 I.U./mg. protein.

EXAMPLE 3

A culture of *Erwinia carotovera* (N.C.P.P.B. 1066) was grown in continuous culture in a "Porton Type" continuous culture apparatus as described by Herbert, Phipps and Tempest (Laboratory Practice 1965, 14, 1150–1161). The stirred fermenter was equipped with automatic equipment for control of temperature and pH, which were maintained at 37° C. and pH 7.0 respectively. The culture medium was 5% Yeatex, and the preparation of medium and seed cultures were as in Example 2.

After inoculating the fermenter, containing 5% Yeatex medium, and allowing the culture to grow up batchwise, flow of fresh sterile medium was initiated. The dilution rate D, that is $f/v$ where $f$ is the flow rate (litres/hour) and $v$ is the culture volume (litres), was held constant at $D = 0.3$ hr.$^{-1}$ for several days until steady state conditions were established, as shown by constancy of bacterial dry weight and L-asparaginase levels in repeated samples. The mean results of bacterial dry weight and L-asparaginase assays at the steady state were as follows:

Bacterial dry weight—2.6 mg./ml.
L-asparaginase—24 I.U./ml.
I./U./mg.—9.2

L-asparaginase produced in accordance with the present invention and extracted and purified as described in our U.S. patent application Ser. No. 852,082 filed Aug. 21, 1969 conforms to a product named as 3.5.1.1-L-asparagine amido hydrolase in International Enzyme Commission terminology, but appears to differ significantly in properties from previously known L-asparaginases derived, for example, from *Escherichia coli*. Amino acid analysis of samples of L-asparaginase from *E. coli* (produced by Farbenfabriken Bayer A.G.) compared with that from *Erwinia carotovora* gave the following results.

| Amino acid | Esch. coli | Er. carotovora |
|---|---|---|
| Asp | 180 | 131 |
| Thr | 120 | 89 |
| Ser | 60 | 64 |
| Glu | 84 | 80 |
| Pro | 48 | 49 |
| Gly | 108 | 123 |
| Ala | 120 | 105 |
| Val | 120 | 98 |
| CyS | 6 | <2 |
| Met | 24 | 33 |
| Ile | 48 | 61 |
| Leu | 84 | 104 |
| Tyr | 54 | 48 |
| Phe | 36 | 27 |
| Lys | 84 | 67 |
| His | 12 | 25 |
| Arg | 36 | 68 |
| Trp | 12 | 0 |

Similarly, comparative measurements of the Iso-electric point (by Iso-electric focussing) gave about pH 5.2 (for *E. coli*) and about pH 8.5 (for *Er. carotovora*); and glutaminase activities of 2–3% of asparaginase activity (for *E. coli*) compared with 5–7% (for *Er. carotovora*). Additionally, the two asparaginases are serologically quite distinct. Antisera raised to each does not cross react with the other asparaginase. The clinical benefit of this is that in cases where treatment with one asparaginase results in the development of sensitivity (an allergic reaction) treatment can be continued with the second asparaginase. Molecular weights of Erwinia-derived asparaginase are normally between about 130,000 and 150,000.

Treatment of leukemia and disseminated cancers is normally carried out by injecting L-asparaginase in a physiological solution such as saline, although it may be possible to achieve oral administration in some circumstances. A typical solution for intravenous injections comprises a 15 mg./ml. solution of L-asparaginase in physiological saline. Typical dosage rates are between about 0.05 and 5.0 mg. per kg. patient body weight.

We claim:
1. A process for the production of L-asparaginase which comprises growing bacteria of the genus Erwinia in a culture medium, disrupting at least a proportion of the resulting bacteria cells to release L-asparaginase, and isolating the released L-asparaginase.
2. A process according to claim 1 wherein the bacteria are of the species *Erwinia carotovora*.
3. A process according to claim 1 wherein the bacteria are of the species *Erwinia chrysanthemi*.
4. A process according to claim 1 wherein the bacteria are of the species *Erwinia aroideae*.
5. A process according to claim 1 wherein the bacteria are of the species *Erwinia atroseptica*.
6. A process according to claim 1 in which the culture medium contains sources of nitrogen and carbon.
7. A process according to claim 6 in which the nitrogen source is provided in inorganic form.
8. A process according to claim 6 in which the carbon source is glucose or glycerol.
9. A process according to claim 6 in which the sources of nitrogen and carbon are peptones, yeast autolysates, or protein hydrolysates.
10. A process according to claim 1 in which the culture medium is a solid culture medium.
11. A process according to claim 1 in which the culture medium is a liquid culture medium.
12. A process according to claim 1 and in which the temperature is maintained between about 10° and 40° C.
13. A process according to claim 12 in which the temperature is between 25° and 35° C.
14. A process according to claim 1 in which the pH is maintained between about 6 and 8.
15. A process according to claim 1 which is carried out under aerobic conditions.
16. The product produced from *Erwinia carotovora*, strain N.C.P.P.B. 1066, by the process of claim 2.

References Cited

Roberts et al.: Journal of Bacteriology, vol. 95, No. 6, June 1968, pp. 2117–2123.

LIONEL M. SHAPIRO, Primary Examiner

U.S. Cl. X.R.

195—66 A; 424—94